United States Patent
Chang

(10) Patent No.: US 9,889,722 B2
(45) Date of Patent: Feb. 13, 2018

(54) AIR EXHAUST DEVICE FOR VEHICLE BODY PANEL

(71) Applicant: Hyundai Motor Company, Seoul (KR)

(72) Inventor: Hoon Chang, Seoul (KR)

(73) Assignee: Hyundai Motor Company, Seoul (KR)

( * ) Notice: Subject to any disclaimer, the term of this patent is extended or adjusted under 35 U.S.C. 154(b) by 756 days.

(21) Appl. No.: 14/340,100

(22) Filed: Jul. 24, 2014

(65) Prior Publication Data

US 2015/0165872 A1 Jun. 18, 2015

(30) Foreign Application Priority Data

Dec. 17, 2013 (KR) .................. 10-2013-0156828

(51) Int. Cl.
*B60H 1/34* (2006.01)
*B60H 1/24* (2006.01)
*B60H 3/06* (2006.01)
*B64D 13/04* (2006.01)
*F24F 7/08* (2006.01)
*F02K 1/34* (2006.01)

(52) U.S. Cl.
CPC ........... *B60H 1/248* (2013.01); *B60H 1/3457* (2013.01); *B60H 3/0641* (2013.01); *B64D 33/06* (2013.01)

(58) Field of Classification Search
CPC ...... B60H 1/248; B60H 1/3457; B60H 1/241; B60H 1/3407; B60H 1/00278; B60H 1/24; B60H 3/0641; B62D 65/16; F15D 1/001; F24F 2007/003; F24F 13/245; B64D 33/06; B64D 11/0626
USPC ........ 454/164, 115, 354, 158, 165; 138/112, 138/144, 177, 161, 150
IPC ....... B60H 1/34,1/24; B64D 13/04; F24F 7/08
See application file for complete search history.

(56) References Cited

U.S. PATENT DOCUMENTS

| | | | | |
|---|---|---|---|---|
| 833,251 A | * | 10/1906 | Schwab | ................. 138/111 |
| 1,201,780 A | * | 10/1916 | Westendarp et al. | .. B60H 1/248 454/164 |
| 2,358,690 A | * | 9/1944 | Decker | ................. B60H 1/248 181/259 |
| 2,565,555 A | * | 8/1951 | Goldberg | ........... B60K 15/0406 110/184 |

(Continued)

FOREIGN PATENT DOCUMENTS

| EP | 1 332 899 A2 | 8/2003 | |
|---|---|---|---|
| JP | 55110613 A | * 8/1980 | ............. B60H 1/248 |

(Continued)

*Primary Examiner* — Gregory Huson
*Assistant Examiner* — Daniel E Namay
(74) *Attorney, Agent, or Firm* — Morgan, Lewis & Bockius LLP

(57) ABSTRACT

An air exhaust device for a vehicle body panel, which can prevent the inflow of noise, dust and exhaust gas while providing a ventilation function for discharging indoor air to the outside and can enhance a stiffness around an aperture, may include a main body plate, a filtering member, and an air exhaust passage. The main body plate is coupled to the vehicle body panel to block the aperture. The filtering member is disposed in a reception part of the main body plate to block foreign substances introduced from the outside and to allow air passing through. The air exhaust passage extends from the reception part to the outside of the vehicle body panel to discharge the air passing through the filtering member to the outside.

6 Claims, 4 Drawing Sheets

(56) References Cited

U.S. PATENT DOCUMENTS

| | | | | |
|---|---|---|---|---|
| 3,012,812 | A * | 12/1961 | Miller, Jr. | B60H 1/248 454/164 |
| 3,706,208 | A * | 12/1972 | Kadi | F16L 59/141 138/112 |
| 4,036,617 | A * | 7/1977 | Leonard | F16L 7/00 138/112 |
| 4,036,618 | A * | 7/1977 | Leonard | F16L 9/18 138/110 |
| 5,695,397 | A | 12/1997 | Frank et al. | |
| 6,558,246 | B2 * | 5/2003 | Kelly | B60H 1/26 454/145 |
| 7,517,280 | B2 * | 4/2009 | McConnell | B60H 1/249 137/512.1 |
| 2004/0259493 | A1 * | 12/2004 | Valley | B60H 1/248 454/164 |
| 2005/0227607 | A1 * | 10/2005 | Stevenson | B60H 1/249 454/164 |
| 2007/0238407 | A1 * | 10/2007 | Nottke | B60H 1/248 454/164 |
| 2009/0088064 | A1 * | 4/2009 | Lin | B60H 1/248 454/75 |
| 2009/0088065 | A1 * | 4/2009 | Mouch | B60H 1/248 454/164 |
| 2009/0191805 | A1 * | 7/2009 | Cusumano | H01M 8/04 454/158 |
| 2010/0216384 | A1 * | 8/2010 | McCarthy | B60H 1/249 454/70 |
| 2013/0288587 | A1 * | 10/2013 | McClary | B60H 1/267 454/164 |

FOREIGN PATENT DOCUMENTS

| | | | | |
|---|---|---|---|---|
| JP | 61001529 A * | 1/1986 | | B60H 1/243 |
| JP | 11-1120 A | 1/1999 | | |
| JP | 2001-055039 A | 2/2001 | | |
| JP | 2004-067004 A | 3/2004 | | |
| JP | 2006-168550 A | 6/2006 | | |
| JP | 2008-126965 A | 6/2008 | | |
| KR | 20-0267937 Y1 | 3/2002 | | |
| KR | 10-2004-0042709 A | 5/2004 | | |

* cited by examiner

AIR EXHAUST DEVICE FOR VEHICLE BODY PANEL

CROSS-REFERENCE TO RELATED APPLICATION

The present application claims priority of Korean Patent Application Number 10-2013-0156828 filed on Dec. 17, 2013, the entire contents of which application are incorporated herein for all purposes by this reference.

BACKGROUND OF INVENTION

Field of Invention

The present invention relates to an air exhaust device for a vehicle body panel. Particularly, the present invention relates to an air exhaust device for a vehicle body panel, which can prevent the inflow of noise, dust and exhaust gas while providing a ventilation function for discharging indoor air to the outside, and can improve a limitation of a stiffness reduction due to a typical aperture formation.

Description of Related Art

Generally, the vehicle body panel needs to be designed to have a shape and a structure that can minimize the introduction of vibration and noise into the indoor of a vehicle and meet the stiffness of the vehicle body.

A technology of attaching various kinds of pads to the vehicle body panel in order to improve vehicle's vibration and noise is known. In this case, the pads are directly attached to the vehicle body panel by an adhesive method, or a foaming pad is installed in the internal space of the vehicle body panel in advance and then is foamed to fill the internal space by a heating process.

Meanwhile, a ventilation aperture is added to the vehicle body panel to secure the ventilation performance of a vehicle. In this case, the inflow of noise and exhaust gas into the indoor of a vehicle through the ventilation aperture needs to be prevented. Also, since the stiffness of the vehicle body can be reduced due to the aperture formation, a method for overcoming this limitation is needed.

A typical vehicle performs the indoor ventilation and the indoor moisture removal by discharging indoor air through the ventilation aperture that is added to the side of a vehicle quarter panel for the ventilation performance.

More specifically, when an air conditioner or a heater operates in a state where all door glasses are closed, air from the air conditioner or the heater is supplied to the enclosed indoor of a vehicle. Accordingly, a passage is needed to discharge a portion of supplied indoor air to the outside.

Also, when the door glasses is misted by the moisture of the enclosed indoor of a vehicle but the door glass cannot be opened due to rain, snow, heat, or exhaust gas of the outside, the air conditioner or the heat is operated to remove the mist of the glasses. In this case, a passage for discharging a portion of the indoor air is desperately needed. Accordingly, a ventilation structure is being applied to the vehicle body panel. For example, a ventilation aperture for discharging air out of the indoor of a vehicle is formed at a lower portion of the rear side of a side outer panel, and a grill is mounted in the ventilation aperture.

Also, a passage is needed to discharge the indoor air of a vehicle to the ventilation aperture mounted with the grill. For this, an aperture for air exhaust is additionally formed in the vehicle body quarter panel. However, the stiffness of the vehicle body may be reduced due to the additional formation of the aperture in the quarter panel. Also, although air exhaust is possible when the aperture for the air exhaust is formed in the quarter panel to discharge the indoor air, noise (road noise) may be introduced into the indoor of a vehicle due to a large aperture of the quarter panel when an assembly and dimension defect between parts occurs.

Furthermore, when dust or exhaust gas is introduced through the ventilation aperture mounted with the grill, the dust or exhaust gas may be introduced into the indoor of a vehicle through the aperture for the air exhaust of the quarter panel.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

The present invention provides an air exhaust device for a vehicle body panel, which can prevent the inflow of noise, dust and exhaust gas while providing a ventilation function for discharging indoor air to the outside, and can enhance a stiffness that is reduced due to a typical aperture formation.

In various aspects, the present invention provides an air exhaust device for a vehicle body panel, which is disposed in an aperture of the vehicle body panel to discharge air to an outside. The device may include a main body plate coupled to the vehicle body panel to block the aperture, a filtering member disposed in a reception part of the main body plate to block foreign substances introduced from the outside and to allow air passing through, and an air exhaust passage extending from the reception part to the outside of the vehicle body panel to discharge the air passing through the filtering member to the outside.

In one aspect, the main body plate may include a plate formed of a metallic material to enhance a stiffness around the aperture.

In some aspects, the air exhaust device may further include a cylindrical protrusion part inserted into the aperture of the vehicle body panel and disposed at the outside of the vehicle body panel, wherein the air exhaust passage may include an air exhaust tube that is disposed on an outer circumferential surface of the cylindrical protrusion part or is integrally formed with the outer circumferential surface of the cylindrical protrusion part, and has an inlet connected to the reception part. In some aspects, the air exhaust tube may be disposed longitudinally along a spiral path on the outer circumferential surface of the protrusion part.

In some aspects, the air exhaust passage may include a plurality of air exhaust tubes that are disposed substantially parallelly along the spiral path on the outer circumferential surface of the protrusion part.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
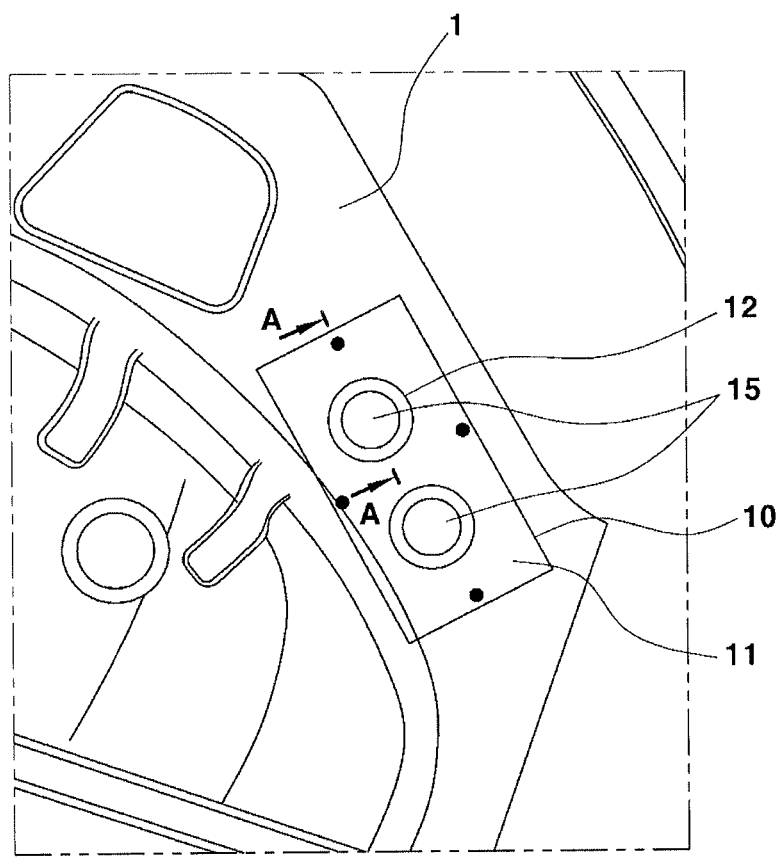
FIG. 1 is a view illustrating an exemplary air exhaust device mounted in a vehicle body panel according to the present invention.

It should be understood that the accompanying drawings are not necessarily to scale, presenting a somewhat simplified representation of various exemplary features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The above and other features of the invention are discussed infra.

The present invention, which relates to an air exhaust device that is mounted in a vehicle body panel and discharges indoor air of a vehicle to secure a ventilation function of a vehicle, provides an air exhaust device for a vehicle body panel, which can prevent the inflow of noise, dust and exhaust gas while providing a ventilation function for discharging indoor air to the outside, and can improve a limitation of a stiffness reduction due to a typical aperture formation.

Figure 2:
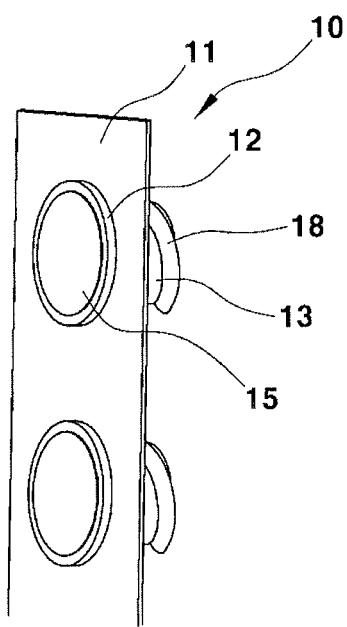
FIG. 2 is a perspective view illustrating an exemplary air exhaust device according to the present invention.
Figure 3:
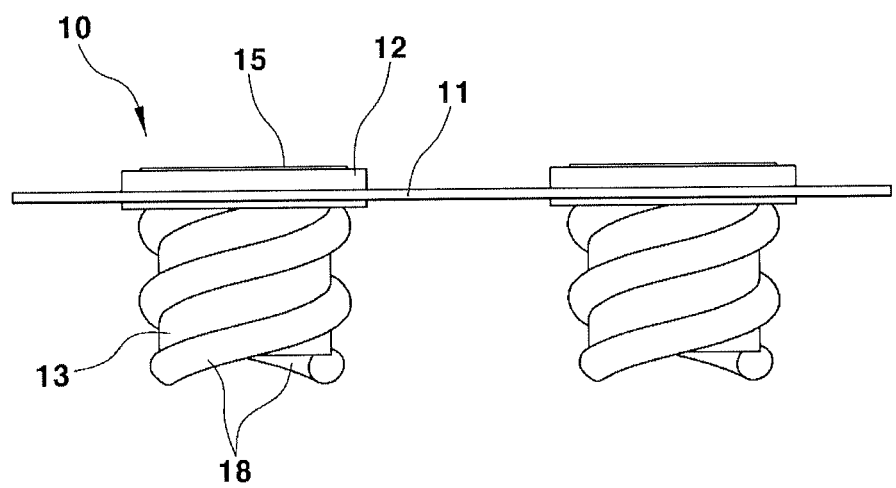
FIG. 3 is a side view illustrating an exemplary air exhaust device according to the present invention.
Figure 4:
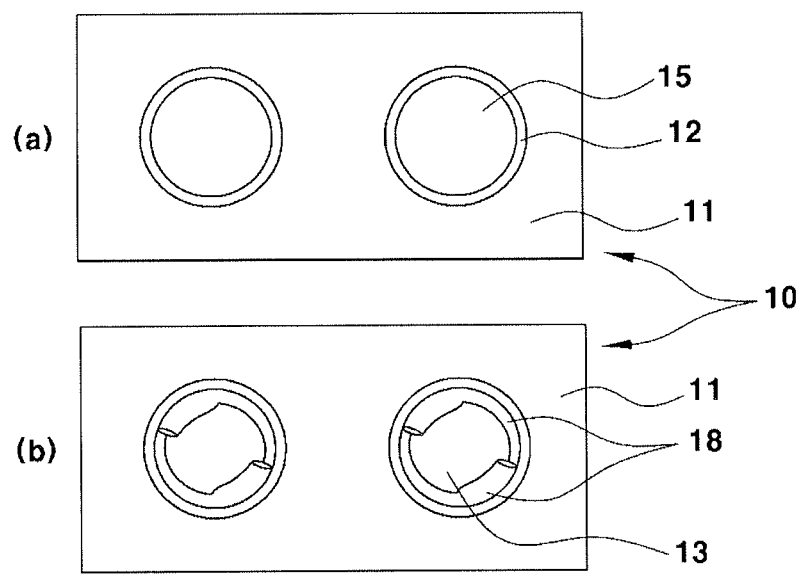
FIG. 4 illustrates an air exhaust device viewed from top and bottom according to the present invention.
Figure 5:
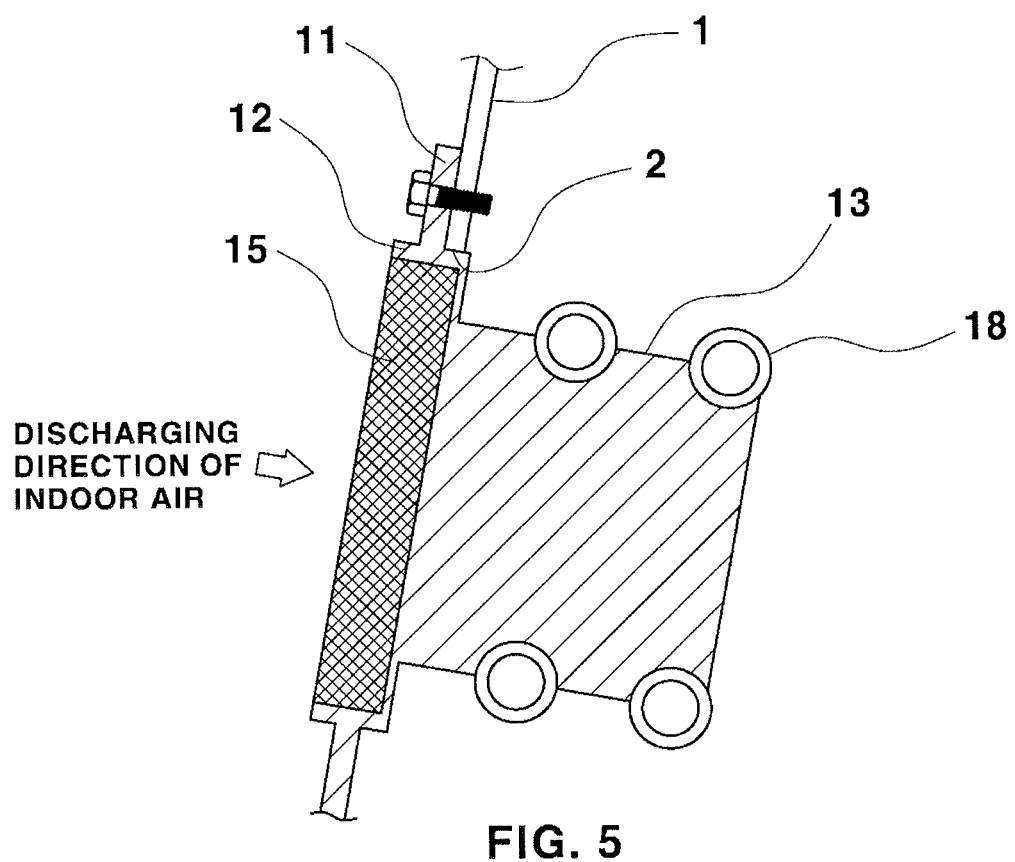
FIG. 5 is a cross-sectional view taken along line A-A of FIG. 1.

FIG. 1 is a view illustrating an air exhaust device mounted in a vehicle body panel according to various embodiments of the present invention. FIG. 2 is a perspective view illustrating an air exhaust device according to various embodiments of the present invention. FIG. 3 is a side view illustrating an air exhaust device according to various embodiments of the present invention. FIG. 4 illustrates an air exhaust device viewed from top and bottom according to various embodiments of the present invention. FIG. 5 is a cross-sectional view taken along line A-A of FIG. 1.

As shown in FIG. 1, an air exhaust device 10 may be mounted around an air exhaust aperture of a vehicle body panel 1, e.g., a quarter panel in which only a typical air exhaust aperture is formed. Since the air exhaust device 10 is a device that discharges indoor air to the outside and needs to pass indoor air through the vehicle body panel 1, an aperture (e.g., 2 of FIG. 5) may be formed in the vehicle body panel 1 to pass indoor air, and the air exhaust device 10 may be mounted in the aperture 2.

The air exhaust device 10 may be mounted in the aperture 2 of the vehicle body panel 1 to discharge air from the indoor to the outdoor of a vehicle and prevent dust and exhaust gas from being introduced from the outdoor to the indoor of a vehicle.

As shown in FIGS. 2 to 4, the air exhaust device 10 may include a main body plate 11 coupled to the vehicle body panel 1 to block the aperture (e.g., 2 of FIG. 5), a filtering member 15 disposed in a reception part 12 provided in the main body plate 11, and an air exhaust passage 18 that extends from the reception part 12 to the outside of the vehicle body panel 1 such that air passing the filtering member 15 is discharged to the outside of the vehicle body panel 1.

The main body plate 11 may be a part that is fixed around the aperture of the vehicle body panel such as by bolts, and may be formed of plastic member in which a metallic material is inserted.

In the air exhaust device 10, the main body plate 11 may reinforce the stiffness around the aperture of the vehicle body panel 1 to minimize the stiffness reduction of the vehicle body panel 1 and serve to support and fix the filtering member 15 in the vehicle body panel 1.

The main plate 11 may be provided with the reception part 12 in which the filtering member 15 is mounted and fixed. The reception part 12 may be provided in singularity or plurality, each of which may be mounted with the filtering member 15. In the drawings, although two reception parts 12 and two filtering members 15 are shown as being disposed, the number of the reception parts 12 and the filtering members 15 may vary without being limited thereto.

In the drawings, although the reception parts 12 and two filtering members 15 are shown as having a circular shape, the shape of the reception parts 12 and the filtering members 15 may vary without being limited thereto.

Meanwhile, the filtering member 15 may be mounted and fixed inside the reception part 12 of the main body plate 11. The filtering member 15 may pass indoor air to the outside, and may prevent or reduce the inflow of outdoor noise, dust, and exhaust gas into the indoor of a vehicle.

The filtering member may be formed of a material such as cloth, paper, resin, which can filter foreign substances such as dust or exhaust particles while passing air. The filtering member may also be formed of similar or the same material as an air conditioner filter.

Alternatively, a foam manufactured from a foaming material may be used instead of the filtering member.

Since the filtering member 15 can be simply attached to or detached from the main body plate, the filtering member 15 may be easily replaced when contaminated.

The air exhaust passage 18 may be disposed so as to extend from the reception part 12 of the main body plate 11 to the outside of the vehicle body panel 1, allowing air passing through the filtering member 15 of the reception part 12 to be discharged out of the vehicle body panel.

In some exemplary embodiments, a cylindrical protrusion part 13 may be inserted into the aperture 2 of the vehicle body panel 1 from the bottom of the reception part 12 of the main body plate 11 to be disposed at the outside of the vehicle body panel 1. The air exhaust passage (or tube) 18 may be spirally disposed along the outer circumferential surface of the protrusion part 13.

The spiral air exhaust tube 18 may become the above-mentioned air exhaust passage that allows air passing the filtering member 15 of the reception part 12 to be discharged to the outside, and may be formed integrally or monolithically with the outer circumferential surface of the protrusion part 13. In some exemplary embodiments, the air exhaust tube 18 may be singly disposed in the outer circumferential surface of the protrusion part 13, but preferably, in some exemplary embodiments, may be parallelly or substantially parallelly disposed in plurality along a spiral path. In the drawing, two air exhaust tubes 18 are illustrated as being disposed parallel to each other.

The number of the air exhaust tubes 18 may vary.

The air exhaust tube 18 may have an outlet disposed at the end of the protrusion part 13 and an inlet connected to the bottom of the reception part 12 so as to communicate with the internal space of the reception part 12 of the main body plate 11. Accordingly, air passing through the filtering member 15 may flow into the inlet and then move along the spiral path to be discharged to the outside of the vehicle body panel 1.

Thus, as shown in FIG. 5, when the air exhaust device 10 is mounted in the aperture 2 of the vehicle body panel 1, indoor air of the vehicle body panel 1 may pass through the filtering member 15, and then may be discharged to the outside of the vehicle body panel 1 through the spiral air exhaust tube 18. Also, the filtering member may appropriately prevent outdoor dust, pollutant particles, noise from being introduced into the indoor of a vehicle.

When the indoor of a vehicle is sealed and the air conditioner of the heat operates, hot or cool air is supplied into the indoor of a vehicle, causing a difference between the indoor and outdoor atmospheric pressures of a vehicle. The atmospheric pressure difference may allow indoor air to be discharged out of the indoor of a vehicle through the air exhaust device 10.

In this case, since the air exhaust tube 18 has a spiral shape, the inflow speed of outdoor dust, pollutant particles, and noise may be reduced while outdoor dust, pollutant particles, and noise are passing through the air exhaust tube 18. Accordingly, the filtering effect of the filtering member 15 may further increase.

Thus, when the air exhaust tube 18 is formed in a spiral shape, it may be more difficult for foreign substances such as dust and exhaust gas and outdoor noise to flow into the indoor of a vehicle, and it may be more effective to prevent foreign substances such as dust and exhaust gas and outdoor noise from being introduced.

Thus, an air exhaust device according to various embodiments of the present invention can improve an indoor environment of a vehicle by effectively preventing or reducing the inflow of outdoor noise, dust, and exhaust gas while securing a ventilation performance of a vehicle by providing a function of an air exhaust passage that can discharge indoor air out of the indoor to the vehicle body panel.

Also, compared with a related art in which a large aperture for air exhaust is simply formed in the vehicle body panel, since a main body plate of the air exhaust device serves to increase the stiffness of the surroundings of the aperture, the reduction of the stiffness of the vehicle body can be minimized, and the requirements of the stiffness of the vehicle body can be satisfied.

For convenience in explanation and accurate definition in the appended claims, the terms "top" or "bottom", "inner" or "outer", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An air exhaust device for a vehicle body panel, which is disposed in an aperture of the vehicle body panel to discharge air to an outside, the device comprising:
    a main body plate coupled to the vehicle body panel to block the aperture;
    a filtering member disposed in a reception part of the main body plate to block foreign substances introduced from the outside and to allow air passing through;
    an air exhaust passage extending from the reception part to the outside of the vehicle body panel to discharge the air passing through the filtering member to the outside; and
    a cylindrical protrusion part inserted into the aperture of the vehicle body panel and disposed at the outside of the vehicle body panel,
    wherein the air exhaust passage includes an air exhaust tube that is disposed on an outer circumferential surface of the cylindrical protrusion part or is integrally formed with the outer circumferential surface of the cylindrical protrusion part.

2. The air exhaust device of claim 1, wherein the main body plate comprises a plate formed of a metallic material to enhance a stiffness around the aperture.

3. The air exhaust device of claim 1,
    wherein the air exhaust passage has an inlet connected to the reception part.

4. The air exhaust device of claim 1, wherein the air exhaust tube is disposed longitudinally along a spiral path on the outer circumferential surface of the protrusion part.

5. The air exhaust device of claim 4, wherein the air exhaust passage includes a plurality of air exhaust tubes that are disposed substantially parallelly along the spiral path on the outer circumferential surface of the protrusion part.

6. The air exhaust device of claim 1, wherein the air exhaust tube has an outlet disposed at an end of the cylindrical protrusion part and an inlet connected to a bottom of the reception part so as to communicate with an internal space of the reception part of the main body plate such that air passing through the filtering member flows into the inlet and then move along the air exhaust tube to be discharged to an outside of the vehicle body panel.

* * * * *